(12) United States Patent
Papakonstantinou et al.

(10) Patent No.: US 8,130,341 B2
(45) Date of Patent: Mar. 6, 2012

(54) UNIFORM DIFFRACTIVE BACKLIGHT

(75) Inventors: Ioannis Papakonstantinou, London (GB); David J. Montgomery, Oxfordshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 340 days.

(21) Appl. No.: 12/546,995

(22) Filed: Aug. 25, 2009

(65) Prior Publication Data

US 2011/0051035 A1    Mar. 3, 2011

(51) Int. Cl.
*G02F 1/1335*    (2006.01)
(52) U.S. Cl. .......................................... 349/65
(58) Field of Classification Search .............. 349/65; 362/630
See application file for complete search history.

(56) References Cited

U.S. PATENT DOCUMENTS

| 6,773,126 | B1 | 8/2004 | Hatjasalo et al. |
| 6,803,977 | B2 * | 10/2004 | Taniguchi et al. .............. 349/65 |
| 7,253,799 | B2 | 8/2007 | Lee et al. |
| 2005/0052732 | A1 | 3/2005 | Chen et al. |
| 2005/0111814 | A9 | 5/2005 | Chen |
| 2006/0187677 | A1 | 8/2006 | Parrika et al. |
| 2006/0285185 | A1 | 12/2006 | Choi et al. |

* cited by examiner

*Primary Examiner* — James Dudek
(74) *Attorney, Agent, or Firm* — Renner, Otto, Boiselle & Sklar, LLP

(57) ABSTRACT

A backlight is provided for illuminating an at least partially transmissive display. The backlight includes a light source. A light guide receives the light from an edge surface and guides the light by total internal reflection. The light is extracted from the lightguide using sub-wavelength extraction features designed on the basis of one grating structure with a second interlinks structure cut into the first structure. The first structure determines the extraction properties. The second structure determines the extraction efficiency and uniformity of the system. Higher efficiency and more uniform sub-wavelength extraction are possible with a device in accordance with the invention.

20 Claims, 9 Drawing Sheets

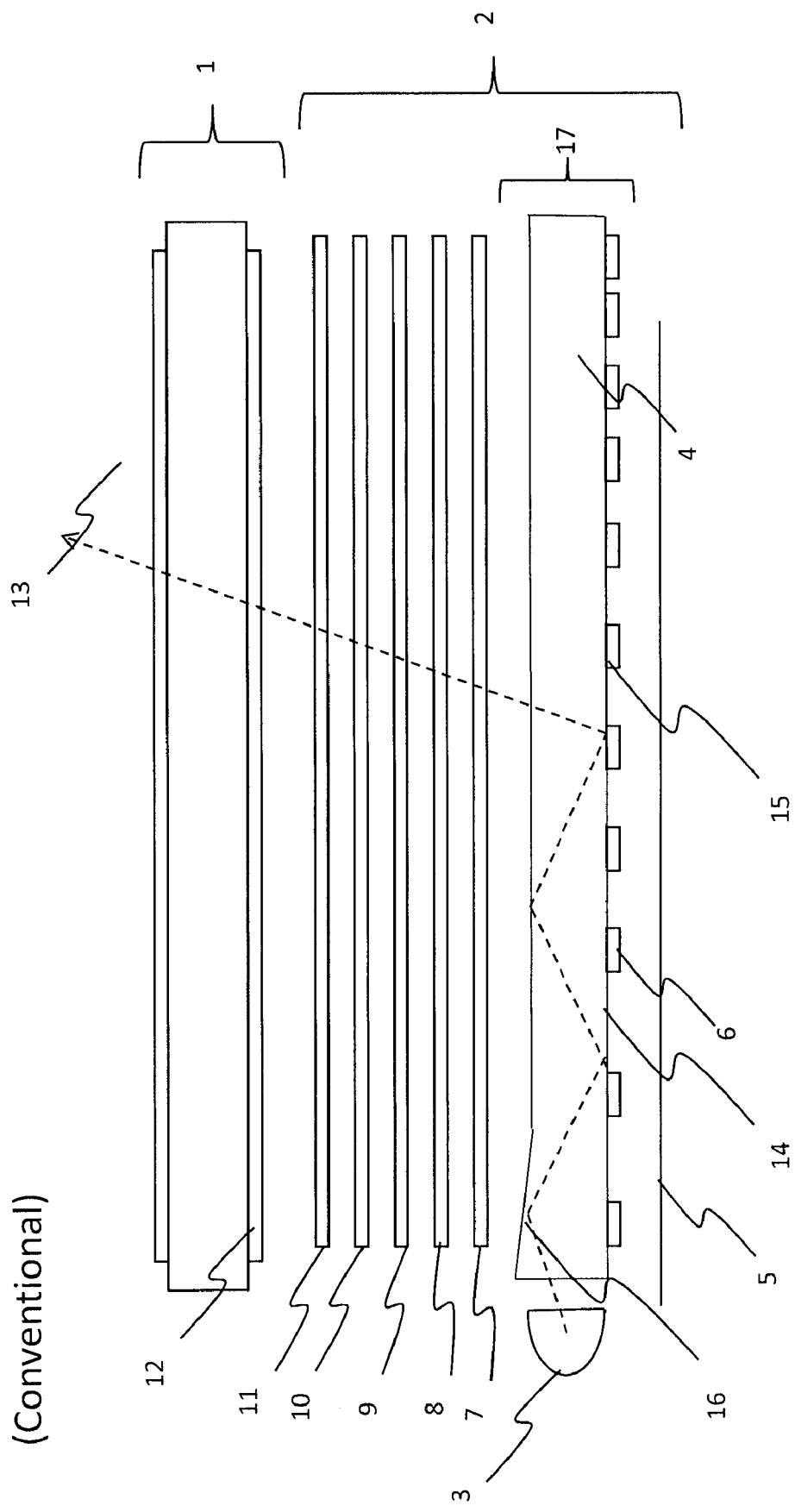
Figure 1:
(Conventional)

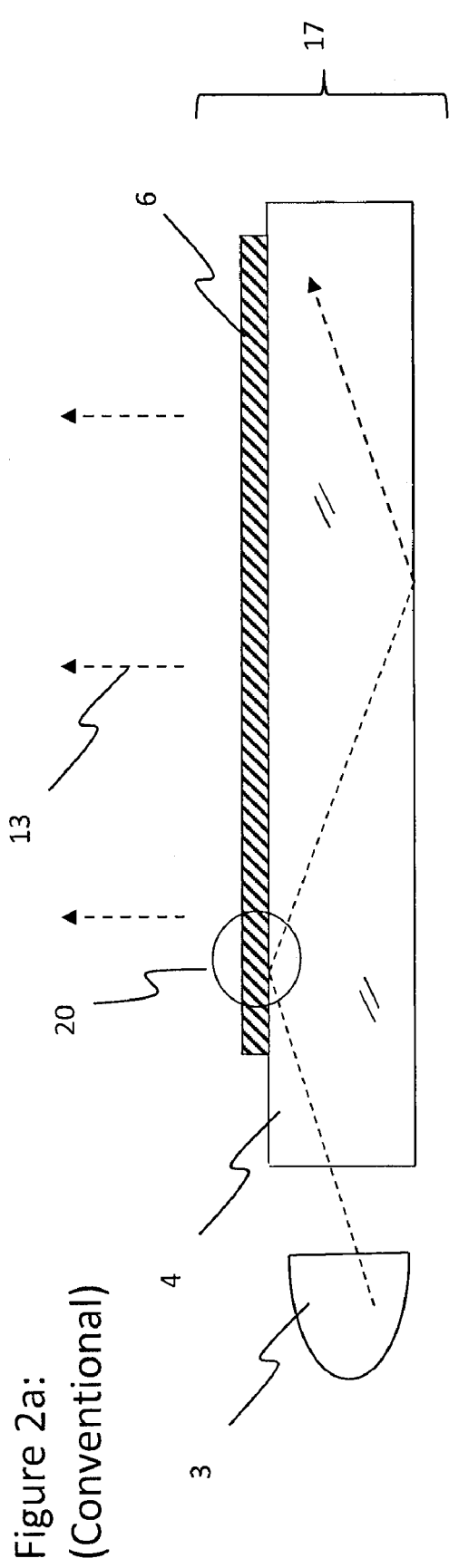
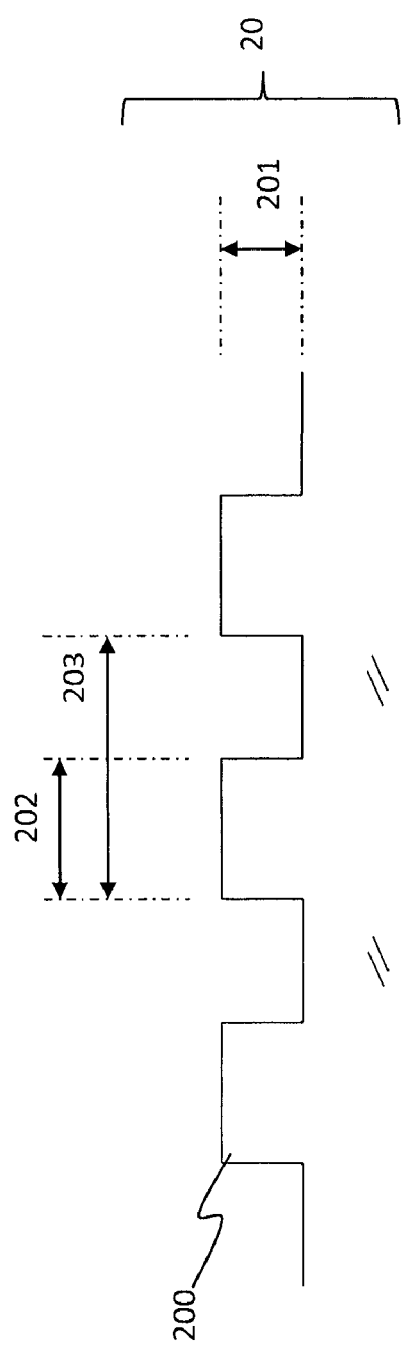
Figure 2a: (Conventional)
Figure 2b: (Conventional)

UNIFORM DIFFRACTIVE BACKLIGHT

TECHNICAL FIELD

The present invention relates to a backlight, for example, for use with an at least partially transmissive spatial light modulator. The present invention also relates to a display including such a backlight, and to a distributed illumination panel that may be used for general illumination. More particularly, the invention relates to an apparatus and method for maintaining uniformity of light provided by a lightguide and ensuring that a substantial fraction of light is extracted from the lightguide in a single pass.

BACKGROUND OF THE INVENTION

FIG. 1 of the accompanying drawings illustrates the stack structure of a typical liquid crystal display (LCD) module of small size, for example for a mobile phone or PDA device. The display comprises a flat transmissive spatial light modulator (SLM) in the form of an LCD panel having input and output polarisers on its bottom and top sides. The rest of the structure is generally regarded as the backlight system, as follows. A light source (for example an LED or Laser) emits light, which is coupled into a light guide and distributed across the back of the display by way of total internal reflection (TIR) in such a way that if no scattering structures were present the light would travel until it reached the end of the light guide. Within the light guide there are multiple scattering structures that extract the light from the light guide to illuminate the LCD panel by disrupting the TIR conditions at the surface of the light guide on which they are located, hence allowing the light to pass through the air light guide interface. These scattering features may be located on either the top or bottom major light guide surfaces. The density of the light scattering features may increase with distance from the light source to maintain a uniform rate of extraction of the light along the length of the light guide. As light is extracted both down and up from the light guide, a reflecting film is placed beneath the light guide to improve the efficiency of the backlight. There are also some optical films between the light guide and the LCD panel, placed to give better illumination uniformity over the display area and to enhance brightness within a given viewing angle range. These films typically consist of diffuser layers and prism films that enhance the central brightness of the backlight. The form of these structures is well known in the prior art and will not be discussed further here.

The form of the features that extract the light can take many forms. The form that this extraction takes can determine the angular profile of the lightguide emission which can then be diffused or utilized in some manner. For example, backlights that require the lightguide to produce collimated emission, the form of the emission will be very sensitive to the range of angles of the light in the lightguide. Other potential extraction, such as sub-wavelength, diffractive or holographic features, will also be dependent on the angle range for the quality of their extraction profile.

In order to minimize loss in the lightguide within the backlight, it is generally necessary to extract a large fraction of the light before it reaches the other end. Reflection and a second pass of light are generally inefficient and introduce substantial non-uniformity.

Extraction features that out-couple light using sub-wavelength or photonic features in order to extract light from the lightguide are necessarily much smaller than typical non-diffractive features that are needed to maintain good uniformity on the lightguide in a single pass. Because of this, the efficiency of extraction is generally low, especially where the features are only refractive index gratings. In addition, patterning the extraction means a substantial fraction of the lightguide surface (especially near the light sources) is not used for extraction reducing further the overall extraction efficiency. This means it is often very difficult to get full efficient extraction using only diffractive features.

US 2006/0285185 (Samsung Electronics Co.) describes a holographic grating whose amplitude increases away from the light sources to enhance extraction efficiency. Although not reported, overall extraction efficiency is expected to be poor especially for small area backlights.

US 2006/0187677 (Parrika et. al.) describes a diffractive backlight with a grating whose duty cycle (or fill factor) increases further from the light emitting devices to increase light extraction. The efficiency of this design is limited by the period of the grating, the smaller the period the less the duty cycle that can be filled. Also overall extraction efficiency is expected to be poor especially for small area backlights.

US 2005/0111814 (Taiwan Nano Electrico-Optical Technology Co.) describes a diffractive backlight with longitudinal diffraction elements only. The size, density and shape of the diffraction elements vary along the backlight to improve uniformity. Total extraction efficiency is expected to be very poor.

US 2005/0052732 (Hon-Hai Precision Industry Co.) describes a backlight with a number of diffraction units of different efficiency depending on the orientation of the grooves with respect to the direction of light. This design might suffer from angular non-uniformities. Also its total extraction efficiency might be poor.

U.S. Pat. No. 7,253,799 (Samsung Electronics Co.) describes a backlight system with a diffraction grating whose frequency, shape and amplitude remains constant. A mirror mounted at the end of the light guiding plate opposite to the light sources reflects non-extracted light backwards for recycling. Display will appear brighter close to the two ends of the backlight and dimmer towards its middle and there will be losses on reflection.

U.S. Pat. No. 6,773,126 (Oy Modilis Ltd.) describes diffraction elements printed on a backlight with varying extraction efficiency depending on their orientation with respect to the light propagation. Uniformity is achieved by placing the "weaker" diffraction elements closer to the light sources and the "stronger" elements further away from the light sources. Angular non-uniformities will occur with this design and total extraction efficiency will be poor for small area backlights.

SUMMARY OF THE INVENTION

The present invention provides an apparatus and method for improving light extraction efficiency from a lightguide and maintaining uniformity of the extracted light on the simplest sub-wavelength structures: one and two dimensional rectangular and square gratings. The principles in accordance with the invention also can be applied to more complex gratings.

An apparatus and method in accordance with the invention concern the structures used for out-coupling the light. More particularly, the apparatus and method pertain to sub-wavelength grating or photonic structures.

According to a first aspect of the invention, a lightguide is provided for use in distributing light received from a light source. The lightguide exists as part of a backlight assembly for a spatial light modulator. For example this could be a liquid crystal display (LCD) or other display device that utilizes a backlight. The backlight unit can include a reflecting assembly on the opposite face from the LCD and not in contact with the lightguide. The light source may be illuminating another face of the lightguide that may be much smaller in area than two major faces. A substantial part of the light is transmitted by total internal reflection across the lightguide. The lightguide includes at least one layer in substantial optical contact with adjacent layers. At least one face or interface between layers consists of a structure that, when combined, will out-couple light from the lightguide.

With the use of a sub-wavelength grating structure, it is possible to control many aspects of the light that is emitted from the lightguide. For example it is possible to control angular distribution, polarization etc. that would be very important for a transmissive spatial light modulator (SLM) based on polarization such as a liquid crystal display LCD. Control of angular distribution allows higher brightness without many additional components allowing more efficient, brighter and thinner displays. Many of these properties can be obtained by simple grating structures of varying types.

Normal extraction features that are typically used in lightguides are typically 20-70 μm. Sub-wavelength structures necessarily are of the order of 1 μm in size or less, meaning that they are less efficient at extracting light propagating by total internal reflection (TIR).

An apparatus and method in accordance with a preferred embodiment of the invention pertain to extraction features that have a high efficiency of extraction while maintaining the properties outlined above. In a preferred embodiment, a simple two level grating structure can be optimized for a particular extraction property, and can have an enhanced and controllable extraction by the superposition of a second grating cut into the "peaks" of the first grating. The second cutaway can have the same pitch as the first grating and can have a width that is less than the width of the "peak" of the first grating. This feature works by interference to enhance the extraction from a given area of feature.

The depth of the extraction feature can be changed with position, thereby allowing controllable extraction (meaning that the whole lightguide can be covered). This reduces moiré effects, improves uniformity and improves the overall efficiency of extraction by having greater coverage over the lightguide. This also allows the features to be constructed more simply in a nano-imrint mold instead of being patterned across the lightguide. The extraction structure may be on one or both sides of the lightguide.

In a second aspect of the invention a further improvement is provided that may be used with the preferred embodiment but also with a normal grating on its own. More particularly, the efficiency of extraction of light is higher for light rays at a smaller angle to the surface normal than others. In this case the lightguide can be designed with a series of stepped sloping features on the opposite side from the extraction features. This changes the angular distribution so that more rays at low angle to the normal are incident as they are "depleted" across the lightguide. This allows both more efficient extraction and improved uniformity. These features are not designed to extract light themselves, only to alter the angular distribution on the features.

According to one aspect of the invention, a lightguide for providing light in a display device includes: a lightguide substrate having first and second major faces and an edge face there between into which light from the light source is injected, the lightguide substrate being configured to transfer the light between the first and second major faces by total internal reflection; and an extraction structure on at least one of the first or second major faces of the lightguide substrate, the extraction structure configured to extract light from the lightguide substrate and comprising a first extraction feature and a second extraction feature, wherein the second extraction feature is formed in a peak of the first extraction feature.

According to one aspect of the invention, the extraction structure utilizes interference to enhance light extraction from a given area of feature.

According to one aspect of the invention, a pitch of the second extraction feature is equal to a pitch of the first extraction feature.

According to one aspect of the invention, a width of the second extraction feature is less than a width of the peak of the first extraction feature.

According to one aspect of the invention, a depth of the second extraction feature within the first extraction feature is a function of a position of the second extraction feature in the extraction structure.

According to one aspect of the invention, the extraction structure includes a third extraction feature and a fourth extraction feature formed in a peak of the third extraction feature, wherein the first extraction feature is located nearer to the edge face than the third extraction feature, and wherein a depth of the second extraction feature is less than a depth the fourth extraction feature.

According to one aspect of the invention, the extraction features comprise first and second gratings.

According to one aspect of the invention, the extraction features are sub-wavelength holographic structures.

According to one aspect of the invention, at least one of the first or second extraction features varies in at least one dimension along the first or second major face.

According to one aspect of the invention, the extraction structure is formed on both the first and second major face.

According to one aspect of the invention, the first and second extraction features comprise at least one of one or two dimensional square gratings.

According to one aspect of the invention, the lightguide further comprises a series of stepped sloping features arranged on a side opposite the extraction structure.

According to one aspect of the invention, a lightguide for providing light in a display device includes a lightguide substrate having first and second major faces and an edge face there between into which light from the light source is injected, the lightguide substrate being configured to transfer the light between the first and second major faces by total internal reflection; an extraction structure on at least one of the first or second major faces of the lightguide substrate to extract the light from the lightguide substrate; and a series of stepped sloping features arranged on a side opposite the extraction structure.

According to one aspect of the invention, the series of stepped sloping features comprise a first stepped sloping feature and a second stepped sloping feature, the first stepped sloping feature positioned closer to the edge face than the second stepped sloping feature, wherein a slope of the first stepped sloping feature is less than a slope of the second stepped sloping feature.

According to one aspect of the invention, the stepped sloping features are formed as lenticular structures.

According to one aspect of the invention, the stepped sloping features are formed as triangular structures.

According to one aspect of the invention, a slope of each stepped sloping feature is a function of position of the stepped sloping feature in the extraction structure.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 1 illustrates a conventional backlight.
FIG. 2a illustrates a detail of a conventional lightguide.
FIG. 2b illustrates a detail of conventional grating extraction features.
FIG. 3b illustrates a detail of the diffractive layer of the device of FIG. 3a.

DETAILED DESCRIPTION OF THE INVENTION

Figure 3A:
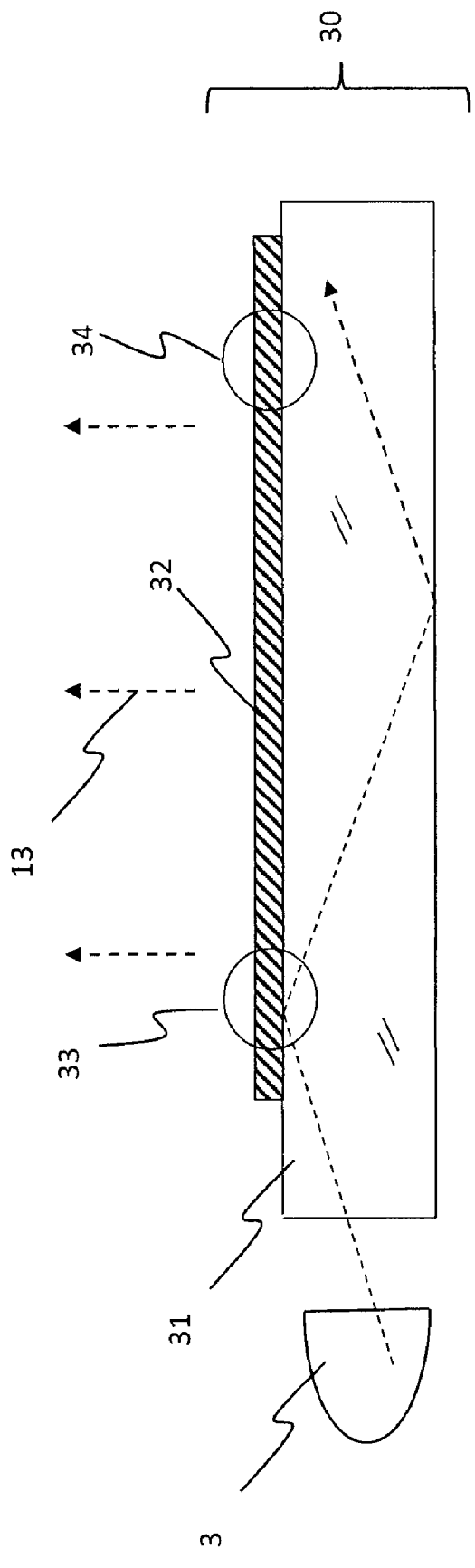
FIG. 3a illustrates an overview of en exemplary device in accordance with the invention.

The present invention will now be described in detail with reference to the drawings, in which like reference numerals are used to refer to like elements throughout.

FIG. 1 illustrates a conventional small area liquid crystal display. The display includes a liquid crystal display panel 1 and a backlight unit 2. A white light source 3, which can be a fluorescent tube, a LED with phosphor, RGB LED group, a laser or other light source, is positioned to inject light into the edge of a thin lightguide 4. The lightguide 4 is designed to transfer by total internal reflection (TIR) 14 the light across the area of the display. The lightguide 4 may have a taper 16 on one of the larger sides near the light sources to allow a thinner lightguide. At least one large face, which can be the top, bottom (illustrated) or both faces, has features 6 that disrupt the TIR 14 in the lightguide so that the light 13 leaves the lightguide. The light that leaves the lightguide generally has the wrong angular brightness characteristics for the display, so four additional layers, a strong diffuser 7, two crossed prism sheets 8 and 9 in orthogonal directions and a weak diffuser 10 are used to produce the correct angular distribution. In many cases the weak diffuser 10 is incorporated into the top prism layer 9. A further layer 11 can be a polarization conversion film, which is typically an interference film that reflects one polarization and transmits the other to improve efficiency.

FIG. 2a illustrates the conventional light source 3 and lightguide arrangement 17, also illustrated in FIG. 1. The lightguide 4 of the lightguide arrangement 17 may have a taper 16, but this is not germane to the invention, and is not shown in FIG. 2a. In this case the extraction features 6 include a sub-wavelength holographic structure, in this case a grating, that could be lenticular (one dimensional) or a grid of "peaks" or "holes". FIG. 2b illustrates the cross section from either a 1D or 2D grating at a location 20 near the light source. The illustrated grating 200 is rectangular but could be any regular periodic shape and may have a different period in the two dimensions. The properties of the grating are determined by the pitch 203, the "peak" width 202 and the "peak" height 201.

Uniformity in this type of grating is conventionally done by patterning a differing spatial density of these features, changing the pitch or height of the features. In the former case, moiré and low efficiency of extraction is the result. In the latter case, differing extraction properties as a function of position is the result.

In the device and method in accordance with the present invention, the extraction properties of the grating are maintained, patterning across the lightguide is maintained, and the extraction efficiency is significantly increased. An overview of the preferred embodiment of the device in accordance with the invention is shown in FIG. 3a.

The preferred embodiment shows a lightguide structure 30 that includes a lightguide 31 and light source 3 that will be described in reference to the prior art lightguide 4 of FIG. 1 and the changes only will be described here. The changes refer to the lightguide alone and the other features of the backlight remain the same.

The lightguide is illuminated by a light source 3 (for example an LED, laser or fluorescent tube light source) in which a majority of the emitted light is incident into the lightguide. The lightguide may have a taper 16, but this is not germane to the invention and is not shown in FIG. 3a. The lightguide 31 has new extraction features 32 that may vary in a one or two dimensional way from the light sources and two specific examples are illustrated. Near the light source 33 and far from the light source 34 are illustrated in FIGS. 3b and 3c respectively.

Figure 3B:
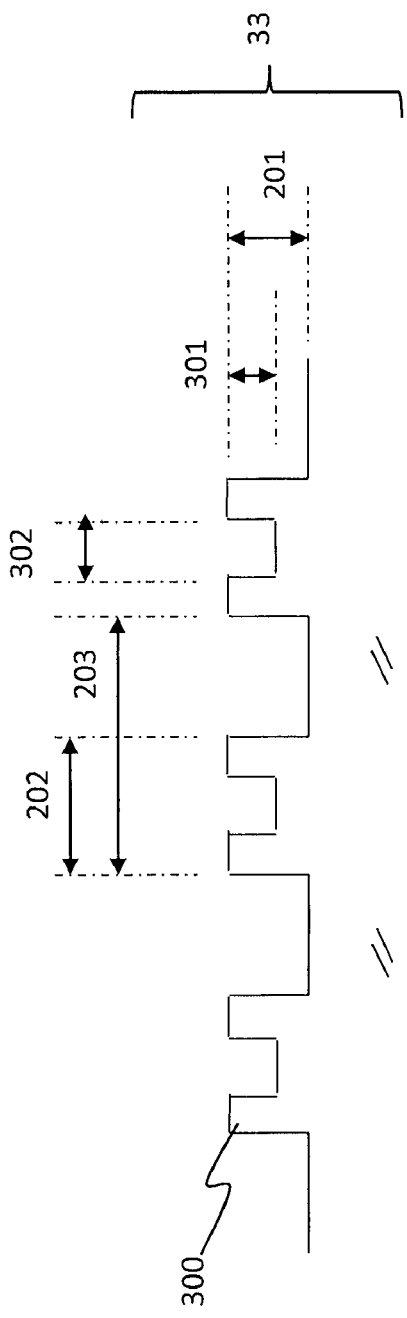
Figure 3C:
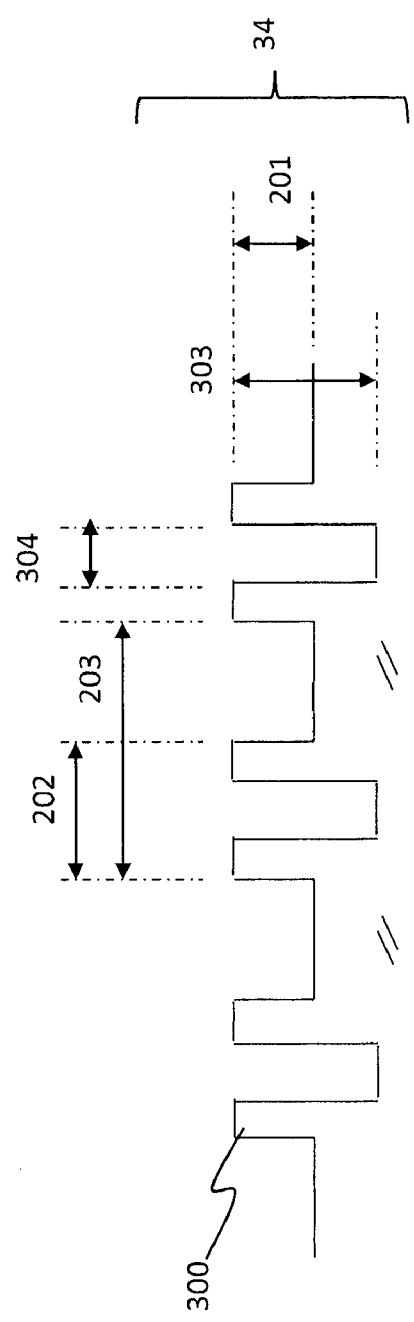
FIG. 3c illustrates another detail of the diffractive layer of the device of FIG. 3a
FIG. 4a illustrates the extraction efficiency as a function of height of the second features.

The section illustrated in FIG. 3b shows the grating structure 300 with pitch 203, "peak" width 202 and height 201 which determines the general output properties of the lightguide as described in the prior art. As before, the grating may be a lenticular or two dimensional grating structure.

To maintain uniformity, conventional methods are not used. Instead, the grating is patterned in a constant manner across the lightguide, but features are cut away from the "peaks" of this structure and the depth 301 and width 302 of these features can be varied. It is possible that only the depth 301 is varied as a 1D or 2D function of position. Other cutaway features are possible with improved efficiency, but a square configuration is currently easiest to manufacture, so this configuration is described.

Near the light sources, the depth 301 is small. In FIG. 3c, the width 304 and depth 303 are different. The two widths 302 and 304 may be substantially the same. The depth 303 is significantly greater to extract a significantly higher fraction of the light in the lightguide.

To illustrate the operation of the lightguide in accordance with the invention a particular grating structure is considered where the grating pitch 203 is 400 nm, the width 202 is 200 nm and the height 201 is 200 nm. In this pattern, the extracted light at 550 nm wavelength is substantially extracted normally to the surface. Red and blue light are extracted at a small angle either side.

Figure 4A:
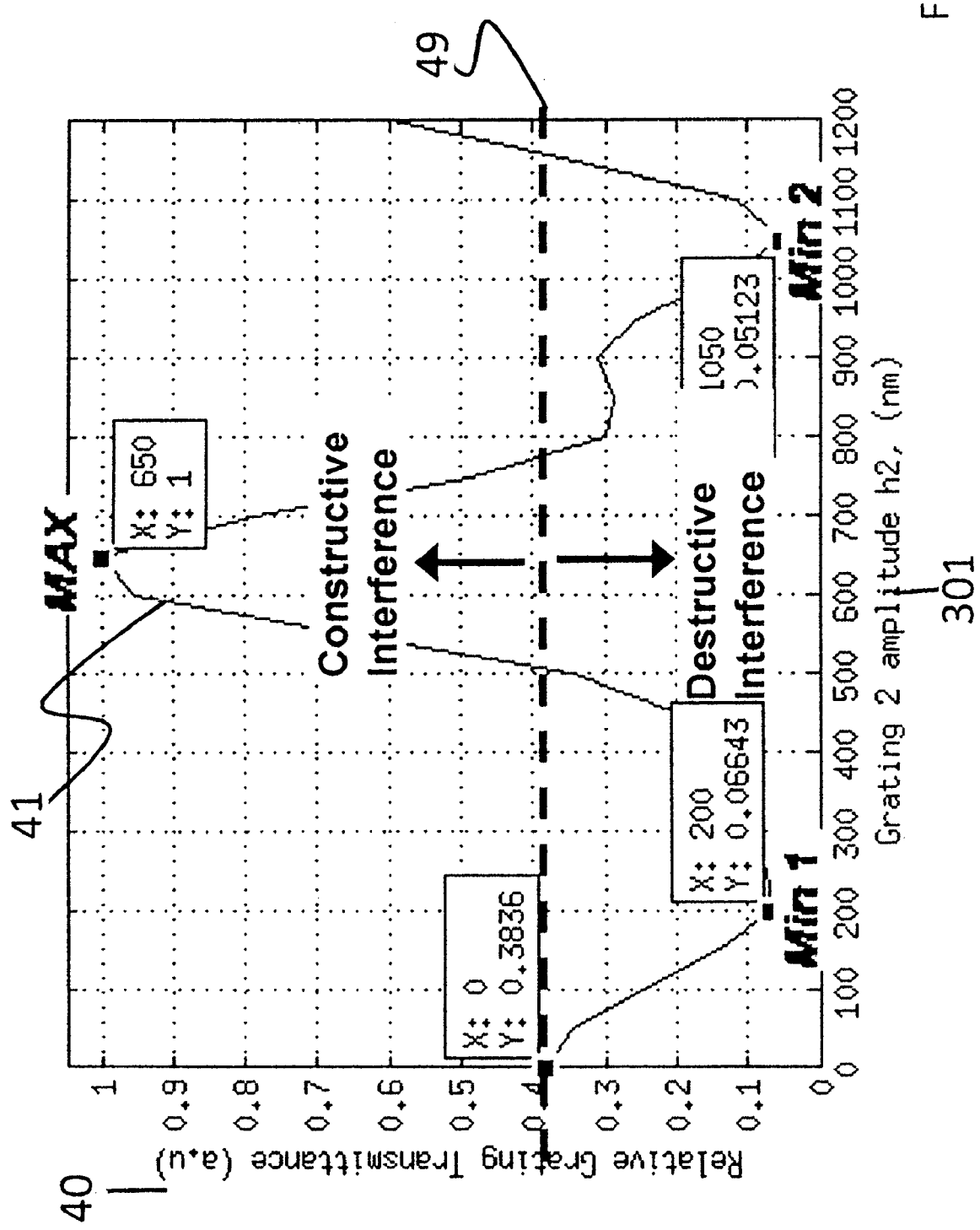
FIG. 4b shows the relative change in energy in the lightguide in the two cases.
FIG. 4c shows the uniformity of the lightguide as a function of position.

The efficiency of extraction as a function of the cutaway height 301 in this grating is illustrated in FIG. 4a. This graph is a plot of extraction efficiency 40 against cutaway height 301. The plot 41 shows two strong minima and a maximum. The extraction efficiency of the prior art 49 is 0.4 on this chart. Low values of 200 nm cutaway height 301 can be used near the light sources (extraction efficiency <0.1), where extraction is required to be low and higher values of height 303 near 700 nm can be used far from the light sources (extraction efficiency 1).

Figure 4B:
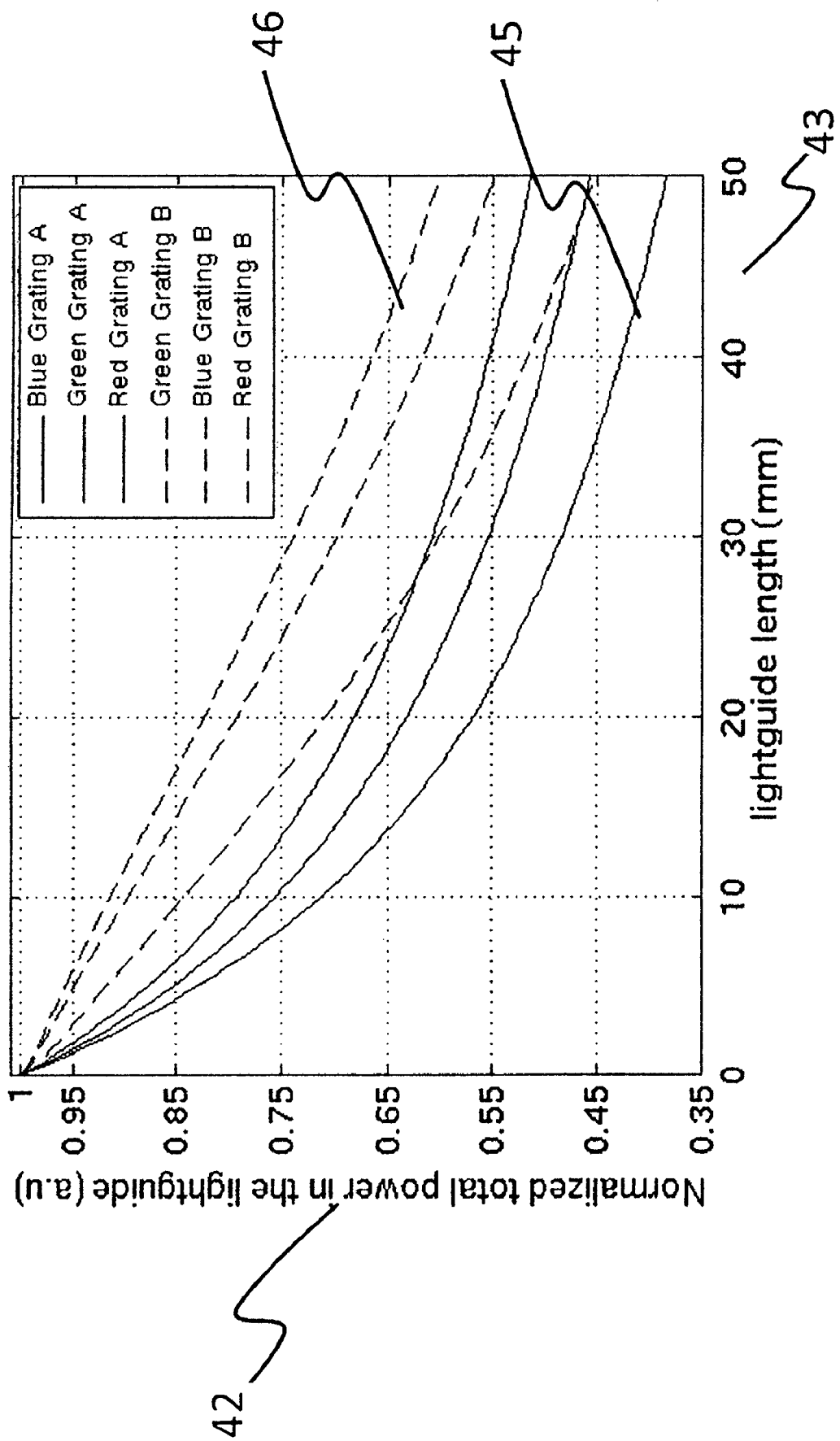

FIG. 4b illustrates the amount of power in the lightguide 42 as a function of distance from the light sources 43. For uniform emission, this should be a straight line from 1 to 0 at the far end of the lightguide. The prior art 45 results show a strong curve, whereas the invention has a similar extraction but much straighter lines 46.

Figure 4C:
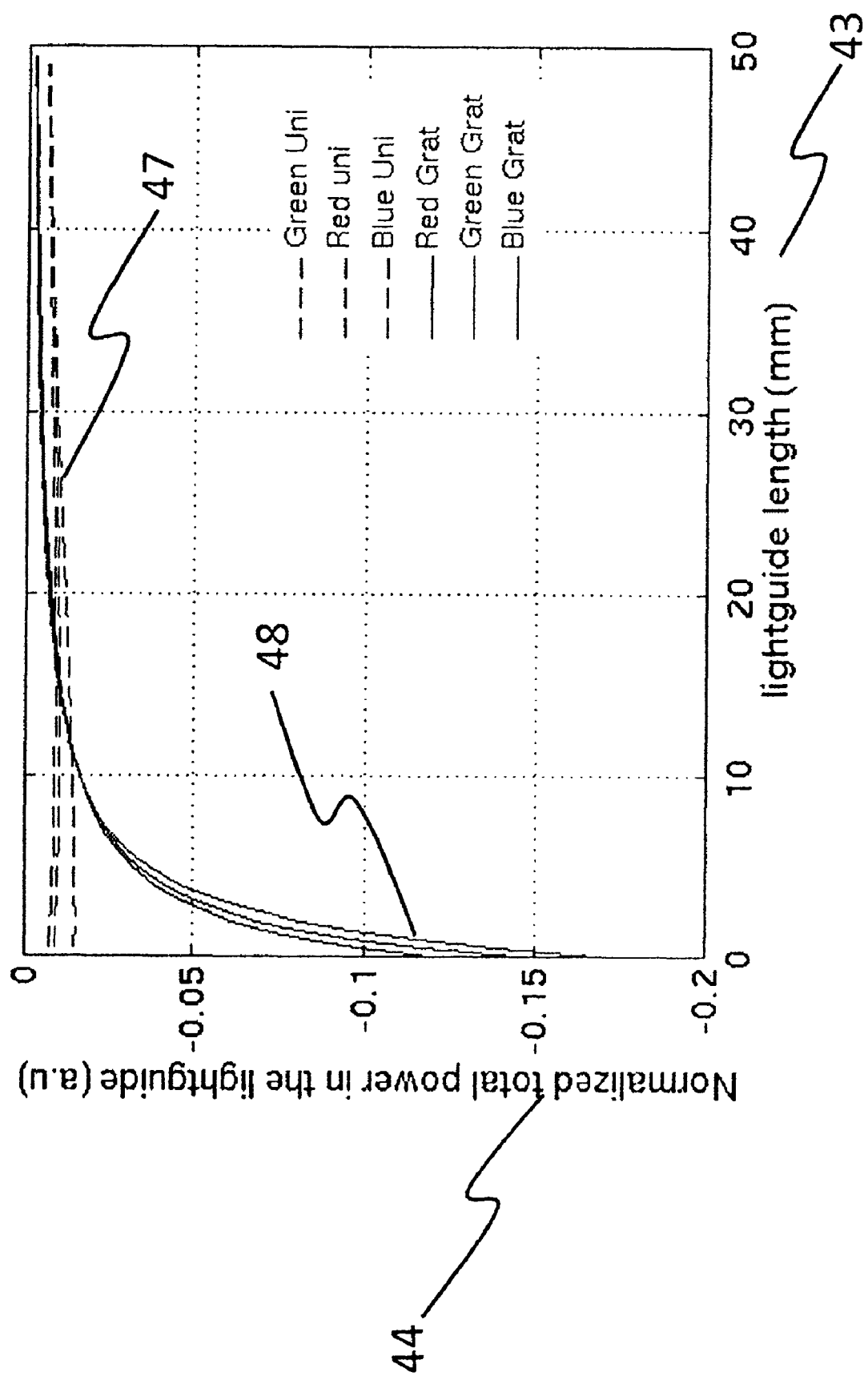
Figure 5:
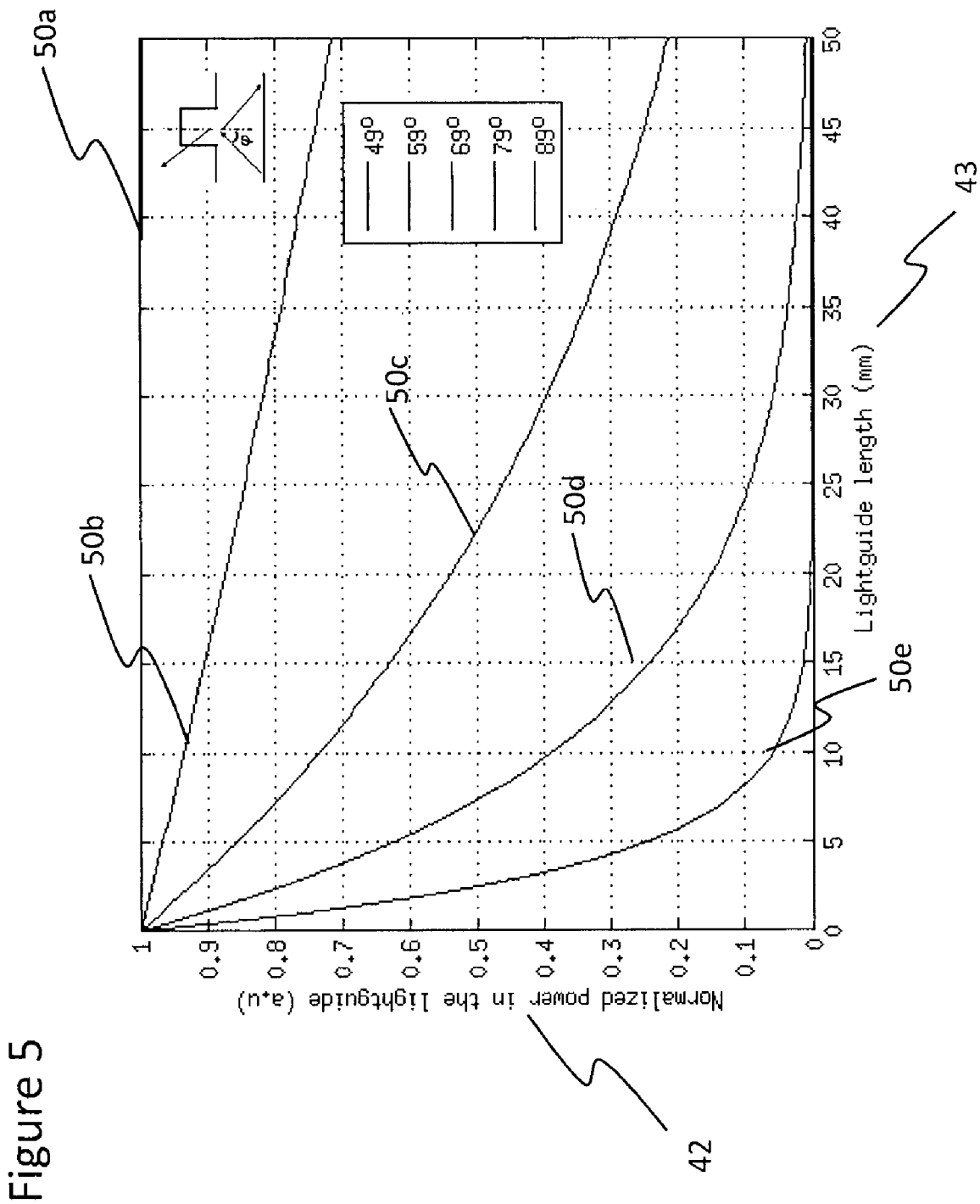
FIG. 5 shows destructive interference with increasing depth.

FIG. 4c illustrates the differential of this plot 44 against position 43. The prior art results 48 show a strong curve whereas the lightguide in accordance with the invention shows a flat and very uniform emission 47. With the features in the prior art, the extraction properties decide the structure and thus the extraction efficiency is set. The apparatus in accordance with the present invention improves and controls the extraction efficiency. More particularly, the apparatus and method in accordance with the present invention allows the extraction efficiency to be controlled while keeping the normal parameters. Essentially, the cutaway section is at the same pitch as the original features, therefore pitch dependent effects (e.g., main defraction direction) do not change. The cutaway section then divides the main peaks so that defraction between these two parts can constructively (improving the extraction) or destructively (reducing extraction) interfere along the main diffraction direction, depending on the size and shape of the cutaway feature. FIG. 5 shows destructive interference with increasing depth for this particular example. Controlling this shape can control the uniformity by controlling the extraction efficiency.

In order to improve the overall extraction efficiency it is important to look at the extraction efficiency as a function of the angle that is incident from within the lightguide of the light on the grating structure. For the grating structure mentioned above, the data is illustrated in FIG. 5. In this figure, the extraction efficiency on a plane grating 42 against distance along the lightguide 43 is shown for different angles of incidence. Plot 50a shows the extraction of rays at 89 degrees to the normal, 50b shows extraction for rays at 79 degrees, 50c for rays at 69 degrees, 50d for rays at 59 degrees and 50e for rays near the TIR limit at 49 degrees. It is clear that the extraction is very efficient for rays at lower angles.

Extraction of high angle rays close to the light sources means that extraction becomes increasingly more difficult far from the light sources. Thus to improve the extraction, altering the angles of the light without extraction is a worthy goal.

Figure 6:
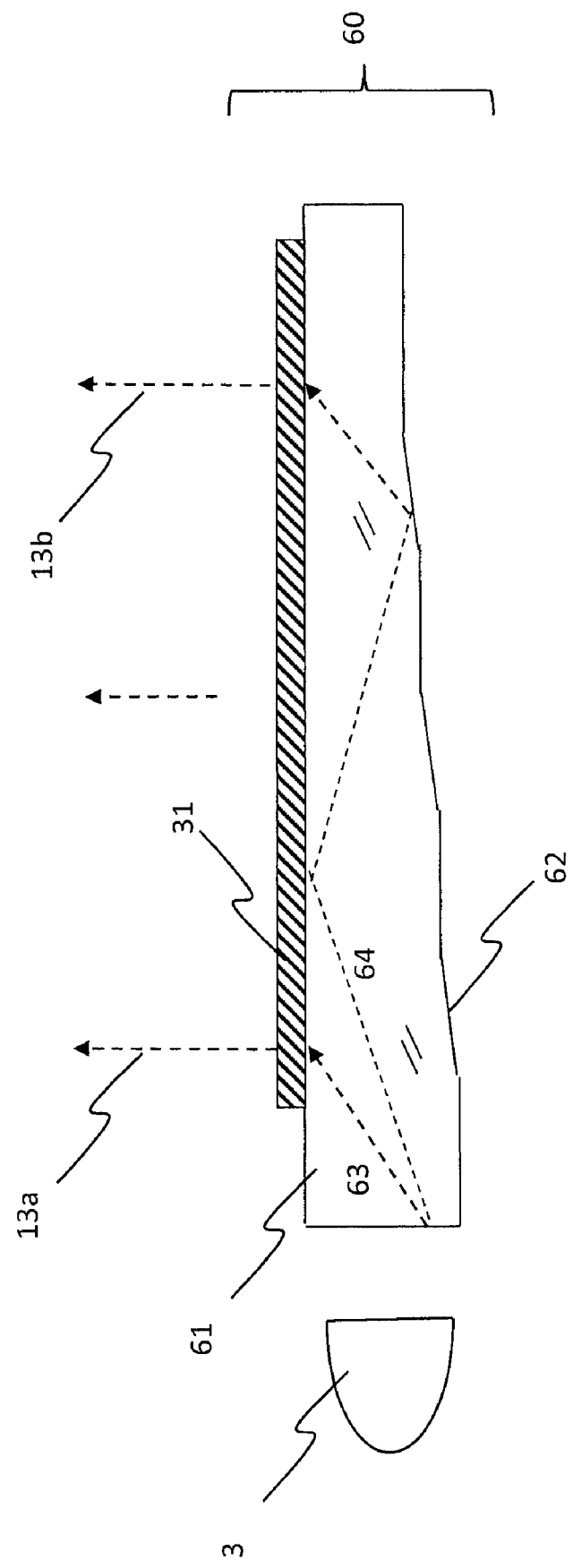
FIG. 6 illustrates another exemplary device in accordance with the invention.

FIG. 6 illustrates a device in accordance with another aspect of the invention. This device seeks to address the angle issue as described above. The aspect includes a new lightguide arrangement 60 that comprises a lightguide 61, light source 3 and extraction features 31. The new lightguide 61 has shallow slopes 62 cut into the opposite surface of the lightguide to the extraction features. The slopes are not extracting a significant level of light, but instead act to change the angle of light. Light 13a at low angle to the normal 63 is extracted quickly, but light 13b at a higher angle to the normal 64 has the angle reduced by interaction with the slopes until it is efficiently extracted by the extraction features.

This arrangement improves the uniformity of the lightguide by proper control of the slope values as a function of position. The slope angles are likely to be smaller than equivalent extraction features, and can vary from zero at the light sources to a larger value far from the light sources. The features can have a constant slope angle but with variable sizes of the features, becoming bigger further from the light source. The slopes are designed to alter the direction of rays in the lightguide so that they are at a slightly smaller angle to the normal to the lightguide surface. The slope angles typically are on the order of one to three degrees.

The slopes may be lenticular structures but can also be patterned in two dimensions to alter overall uniformity. Triangular structures are also possible when there are light sources from two or more directions with the lightguide. The extraction features according to the present invention are more effective at extracting light at lower angles to the normal (see FIG. 5). The slopes shift existing ray angles to the normal o a more efficient extraction zone.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A lightguide for providing light in a display device, comprising:
 a lightguide substrate having first and second major faces and an edge face there between into which light from the light source is injected, the lightguide substrate being configured to transfer the light between the first and second major faces by total internal reflection; and
 an extraction structure on at least one of the first or second major faces of the lightguide substrate, the extraction structure configured to extract light from the lightguide substrate and comprising a first extraction feature and a second extraction feature, wherein the first extraction feature projects out from a surface of the first or second major face on which the first extraction feature is arranged, and the second extraction feature is formed in a peak of the first extraction feature and recessed within the peak of the first extraction feature.

2. The lightguide according to claim 1, wherein the extraction structure utilizes interference to enhance light extraction from a given area of feature.

3. The lightguide according to claim 1, wherein a pitch of the second extraction feature is equal to a pitch of the first extraction feature.

4. The lightguide according to claim 1, wherein a width of the second extraction feature is less than a width of the peak of the first extraction feature.

5. The lightguide according to claim 1, wherein a depth of the second extraction feature within the first extraction feature is a function of a position of the second extraction feature in the extraction structure.

6. The lightguide according to claim 1, wherein the extraction structure includes a third extraction feature and a fourth extraction feature formed in a peak of the third extraction feature, wherein the first extraction feature is located nearer to the edge face than the third extraction feature, and wherein a depth of the second extraction feature is less than a depth the fourth extraction feature.

7. The lightguide according to claim 1, wherein the extraction features comprise first and second gratings.

8. The lightguide according to claim 1, wherein the extraction features are sub-wavelength holographic structures.

9. The lightguide according to claim 1, wherein at least one of the first or second extraction features varies in at least one dimension along the first or second major face.

10. The lightguide according to claim 1, wherein the extraction structure is formed on both the first and second major face.

11. A lightguide for providing light in a display device, comprising:
a lightguide substrate having first and second major faces and an edge face there between into which light from the light source is injected, the lightguide substrate being configured to transfer the light between the first and second major faces by total internal reflection; and
an extraction structure on at least one of the first or second major faces of the lightguide substrate, the extraction structure configured to extract light from the lightguide substrate and comprising a first extraction feature and a second extraction feature, wherein the second extraction feature is formed in a peak of the first extraction feature, wherein the first and second extraction features comprise at least one of one or two dimensional square gratings.

12. The lightguide according to claim 1, wherein the lightguide further comprises a series of stepped sloping features arranged on a side opposite the extraction structure.

13. A lightguide for providing light in a display device, comprising:
a lightguide substrate having first and second major faces and an edge face there between into which light from the light source is injected, the lightguide substrate being configured to transfer the light between the first and second major faces by total internal reflection;
an extraction structure on at least one of the first or second major faces of the lightguide substrate to extract the light from the lightguide substrate; and
a series of stepped sloping features arranged on a side opposite the extraction structure.

14. The lightguide according to claim 12, wherein the series of stepped sloping features comprise a first stepped sloping feature and a second stepped sloping feature, the first stepped sloping feature positioned closer to the edge face than the second stepped sloping feature, wherein a slope of the first stepped sloping feature is less than a slope of the second stepped sloping feature.

15. The lightguide according to claim 12, wherein the stepped sloping features are formed as lenticular structures.

16. The lightguide according to claim 12, wherein the stepped sloping features are formed as triangular structures.

17. The lightguide according to claim 12, wherein a slope of each stepped sloping feature is a function of position of the stepped sloping feature in the extraction structure.

18. A backlight assembly, comprising:
the lightguide according to claim 1; and
a light source optically coupled to the edge face of the lightguide.

19. A display device comprising the backlight assembly according to claim 18.

20. The display device according to claim 19, wherein the display device is a liquid crystal display device.

* * * * *